United States Patent
Lenz

(10) Patent No.: US 9,562,765 B2
(45) Date of Patent: Feb. 7, 2017

(54) METHOD AND MEASURING SYSTEM TO DETERMINE THE ALIGNMENT OF A FIRST PULLEY OF A BELT DRIVE IN RELATION TO A SECOND PULLEY OF THE BELT DRIVE

(71) Applicant: Prüftechnik Dieter Busch AG, Ismaning (DE)

(72) Inventor: Johann Lenz, Ismaning (DE)

(73) Assignee: PRUFTECHNIK DIETER BUSCH AG, Ismaning (DE)

( * ) Notice: Subject to any disclaimer, the term of this patent is extended or adjusted under 35 U.S.C. 154(b) by 106 days.

(21) Appl. No.: 14/684,582

(22) Filed: Apr. 13, 2015

(65) Prior Publication Data

US 2015/0292878 A1 Oct. 15, 2015

(51) Int. Cl.
G01B 11/27 (2006.01)
F16H 7/02 (2006.01)

(52) U.S. Cl.
CPC .............. G01B 11/272 (2013.01); F16H 7/02 (2013.01)

(58) Field of Classification Search
CPC ... G01B 11/005; G01B 21/042; G01B 21/045; G01B 5/008; G01B 11/24; G01B 11/272
USPC .................................. 33/645, 613, 533, 286
See application file for complete search history.

(56) References Cited

U.S. PATENT DOCUMENTS

| | | | |
|---|---|---|---|
| 4,249,294 A | 2/1981 | Belfiore | |
| 5,987,762 A * | 11/1999 | Toth | G01B 11/27 33/227 |
| 6,098,297 A | 8/2000 | Belfiore | |
| 6,374,507 B1 * | 4/2002 | Lehto | G01B 11/27 33/286 |
| 6,519,866 B1 * | 2/2003 | Gerdes | G01B 11/16 33/645 |
| 6,704,115 B1 | 3/2004 | Hamar | |
| 6,931,738 B2 * | 8/2005 | Bodgren | G01B 11/272 33/286 |
| 2003/0051354 A1 | 3/2003 | Segerstrom et al. | |
| 2006/0274311 A1 | 12/2006 | Andersson | |
| 2014/0223750 A1 * | 8/2014 | Diefenderfer | G01B 11/272 33/286 |
| 2015/0052764 A1 * | 2/2015 | Olszewski | G01B 11/272 33/286 |
| 2015/0292878 A1 * | 10/2015 | Lenz | G01B 11/272 33/228 |

FOREIGN PATENT DOCUMENTS

| | | |
|---|---|---|
| DE | 19914300 A1 | 10/2000 |
| DE | 10025918 A1 | 11/2001 |
| DE | 10064814 A1 | 6/2002 |

(Continued)

OTHER PUBLICATIONS 102014207118.6, German Search Report, Mar. 9, 2015.
EP15162559, Extended European Search Report, Jun. 26, 2015.

*Primary Examiner* — Yaritza Guadalupe-McCall
(74) *Attorney, Agent, or Firm* — Millman IP Inc.

(57) ABSTRACT

The invention relates to a method and a measuring system (16) for determining the alignment of a first pulley (10) of a belt drive (12) with respect to a second pulley (14) of the belt drive (12), whereby the measurement system (16) includes a laser light emitting device (18) and a laser light recording device (20), and whereby the method includes Steps A to F.

12 Claims, 6 Drawing Sheets

(56) References Cited

FOREIGN PATENT DOCUMENTS

Figure 2A:
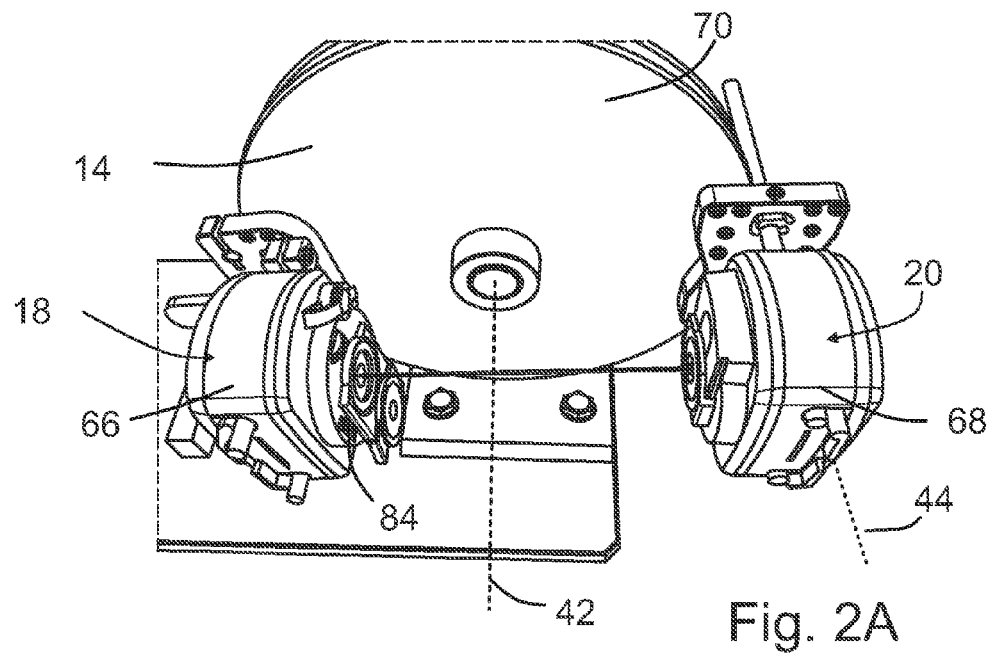

| DE | 10064122 A1 | 11/2002 |
|----|-------------|---------|
| DE | 10206162 A1 | 9/2003 |
| GB | 2329019 A | 3/1999 |
| WO | 00/28275 A1 | 5/2000 |

* cited by examiner

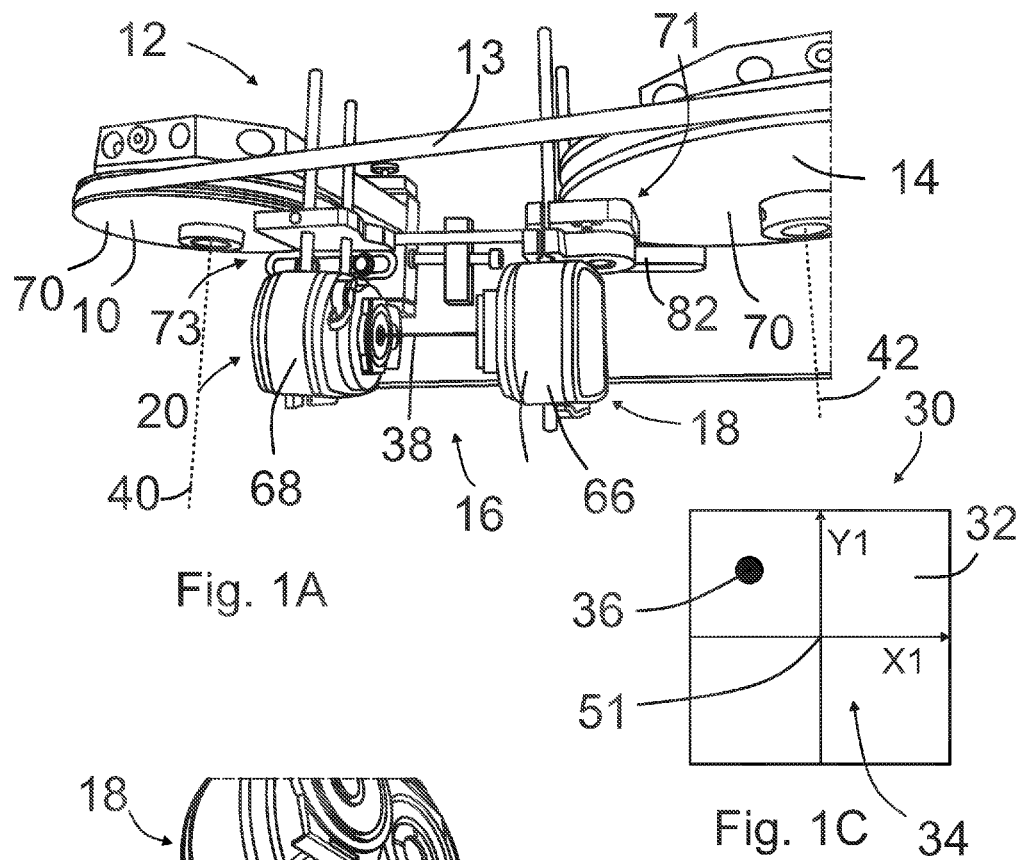
Fig. 1A
Fig. 1C
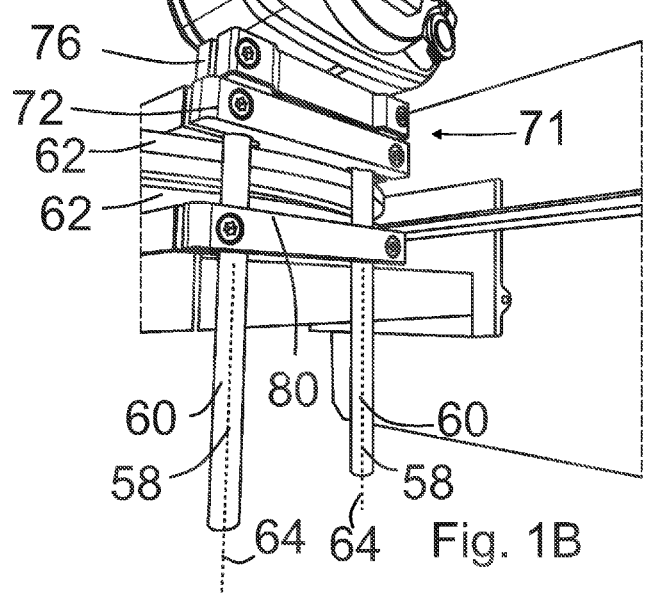
Fig. 1B

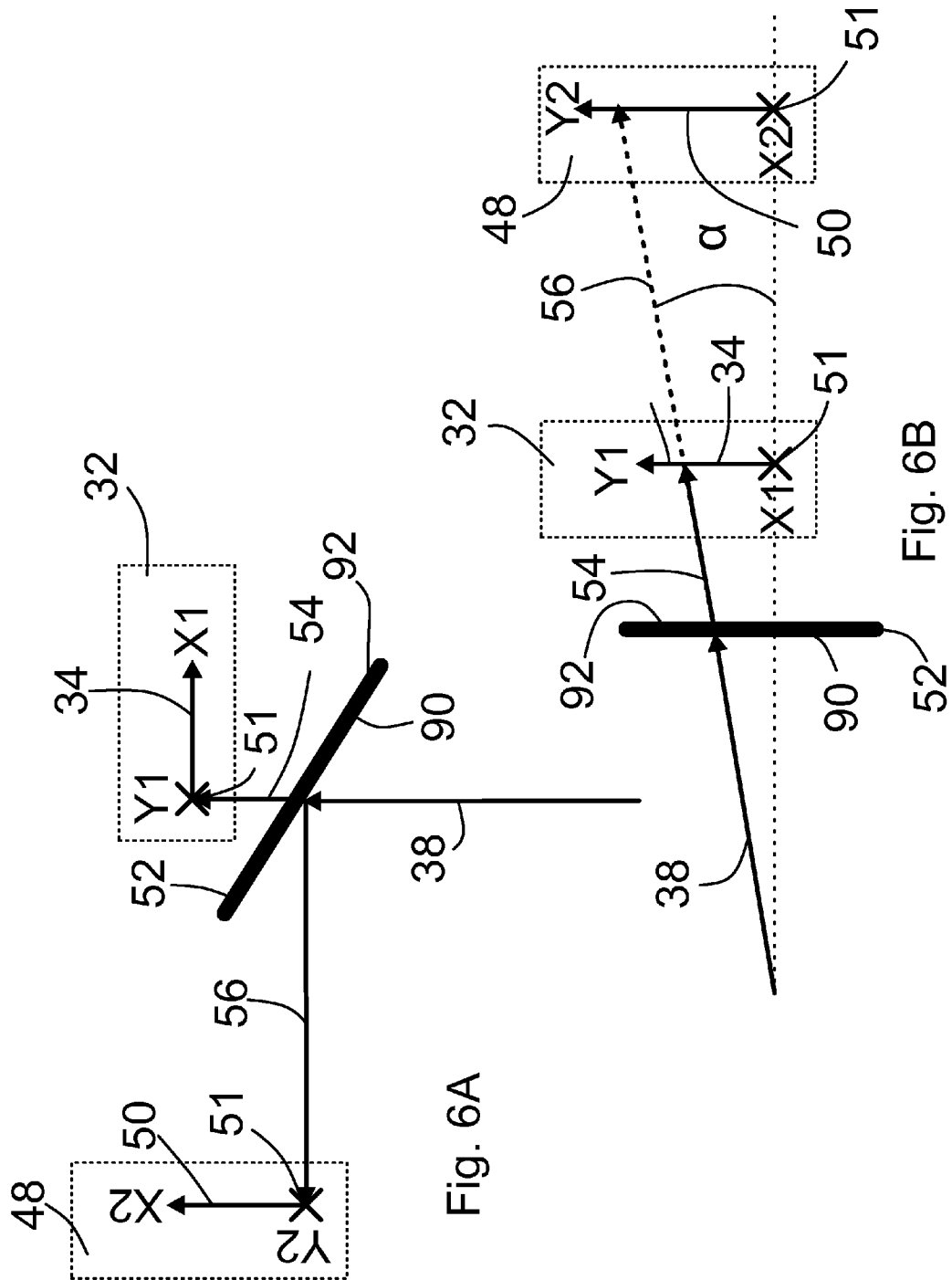

METHOD AND MEASURING SYSTEM TO DETERMINE THE ALIGNMENT OF A FIRST PULLEY OF A BELT DRIVE IN RELATION TO A SECOND PULLEY OF THE BELT DRIVE

CROSS-REFERENCE TO RELATED APPLICATIONS

This application claims the benefit of German patent application DE102014207118.6 filed Apr. 14, 2014, the contents of which are incorporated herein by reference in their entirety.

FIELD OF THE INVENTION

The present invention relates to a method and a measuring system for determining the alignment of a first pulley of a belt drive in respect to a second pulley of the belt drive.

BACKGROUND OF THE INVENTION

Known methods and measurement systems for determining the alignment of the pulleys of a belt drive serve to determine or record the possible deviation from a desired target adjustment or target alignment of the pulleys with one another and/or in order to undertake corresponding corrections to the determined alignment of the pulleys against one another.

Known methods and measurement systems for determining the alignment of the pulleys to each other allow a precise determination of the orientation to the degree if the belt drive or the pulleys themselves satisfy certain boundary conditions. So it is necessary in the case of, known solutions in which a laser is placed against the pulley's running surface or lateral surface which extends circumferentially around the rotational axis of the first pulley, that a certain minimum distance between the laser and the receiver and also between the two pulleys is maintained, in particular, to achieve an acceptable level of measurement accuracy for the measurement or recording of a so-called horizontal angle displacement.

Such solutions are known, for example, in U.S. Pat. No. 6,704,115 B1, US 2003/0051354 A1, U.S. Pat. No. 6,098,297, U.S. Pat. No. 6,931,738 B2, U.S. Pat. No. 4,249,294 and DE 102 06 162 A1.

Known solutions in which the laser and the receiver are respectively placed flush against one of the two opposite disk surfaces of the respective pulley, only operate with sufficiently high measurement accuracy when the disk surfaces are very planar and level. Manufacturing technology-related deviations from a planar or a level structure of the pulley surfaces may, however, take on a magnitude that makes it impossible to work with such a laser and receiver due to high measurement inaccuracy. Solutions in which a laser and a receiver are positioned flush against the disk surfaces of the pulleys, for example, are known from DE 100 64 814 A1.

Underlying Task

The goal of the invention is to provide a method and a measuring system for determining the orientation of a first pulley of a belt drive in respect to a second pulley of a belt drive with which the alignment can be determined with great precision without the precision being restricted or severely limited as a consequence of the structure of the belt drive or the pulleys.

This goal is achieved according to the invention with a method with the features of Claim 1 and with a measurement system with the features of Claim 9.

The method according to the invention for determining the alignment of a first pulley of a belt drive in respect to a second pulley of a belt drive occurs by means of or by using a measurement system.

The measurement system comprises a laser light-emitting device and a laser light recording device.

The laser light-emitting device comprises a laser with a beam axis which is able to pivot around a laser pivot axis that is perpendicular to the beam axis of the laser. Furthermore, the laser is able to pivot around an adjustment axis of the laser light-emitting device that is perpendicular to the pivot axis of the laser.

The perpendicular orientation or perpendicular alignment of the laser pivot axis to the adjustment axis refers to the fact that the laser pivot axis may intersect with the adjustment axis but does not have to intersect with it, whereby, if the two axes do not intersect, these may form a common intersection point due to a translational displacement, and then may enclose a right angle. This applies not only with respect to these axes but subsequently to any axes when dealing with a perpendicular orientation or a perpendicular alignment.

The laser light recording device comprises a laser light sensor with a planar measuring field whereby the measuring field is a coordinate system having an X1 coordinate axis and a Y1 coordinate axis that is perpendicular to the X1 axis, whereby the laser light sensor is set up so as to record on the measuring field the X1 and Y1 coordinates of a laser light spot of the laser light beam that strikes the measuring field.

The laser light sensor can be any laser light sensor that is equipped with a level measuring field. A preferred embodiment is a laser light sensor which features several row sensors to form the measuring field. The X1 and Y1 coordinates recorded by the laser light sensor can be transmitted in the form of analogue or digital signals through a signal transmission path—also wirelessly—e.g. through an evaluation device, such as e.g. a computer, for example in the form of a laptop or a tablet, for further analysis. In particular, the laser light sensor may be a PSD sensor (PSD is an abbreviation for "Position Sensitive Device").

The method comprises the following steps:

(A) locating a laser light-emitting device in an arbitrary position on the second pulley, whereby the laser light emitting device is located on the second pulley so that the laser pivot axis is parallel to the rotational axis of the first pulley or the second pulley.

(B) locating a laser light recording device in or at a position on the second pulley, which is at a distance from the position of the laser light emitting device, whereby the laser light recording device is located in such a way at the second pulley that the Y1 coordinate axis of the measuring field is parallel to the rotational axis of the second pulley, the X1 coordinate axis features a desired spatial orientation or spatial alignment, and the centre of the coordinate system features a predefined axial distance to the second pulley.

(C) alignment of the direction of the laser light beam emitted by the laser light emitting device at a right angle to the rotational axis of the second pulley by means of pivoting the laser around the adjustment axis, and recording the Y1 coordinate of the laser light spot on the measuring field by means of the laser light sensor upon irradiation of the measuring field with the aligned laser beam, (D) location of the laser light recording device in or at least one position on the first pulley, whereby the laser light recording device is arranged in such a way on the first pulley that the Y1 coordinate axis of the measuring field is parallel to the rotational axis of the first pulley, the X1 coordinate axis shows a desired spatial orientation or spatial alignment and the centre of the coordinate systems shows a predefined axial distance from the first pulley.

(E) Irradiating of the measuring field with the aligned laser light beam of the laser from the laser light emitting device—with the laser light beam whose direction was aligned in accordance with Step C of the method—and recording of the X1 and Y1 coordinates of the laser light spots on the measuring field, whereby the measuring field is irradiated in at least one position by means of pivoting the laser around the laser pivot axis, so that the X1 and Y1 coordinates are recorded by at least three laser light spots on the measuring field, and (F) Determination of the orientation of the first pulley in relation to the second pulley on the basis of the recorded X1 and Y1 coordinates of the laser light spots in at least one position and of the Y1 coordinates recorded in Step C.

Steps A and B are used to prepare step C of the method according to the invention, in which the direction of the laser light beam emitted by the laser of the laser light-emitting device is aligned by pivoting the laser around the adjustment axis at a right-angle to the rotational axis of the second pulley. In this way, a laser light reference plane can be created for the second pulley in the manner of a pivot plane by pivoting the laser around the laser pivot axis. Following the completed alignment, this pivot plane is then oriented at a right angle to the rotational axis of the second pulley and/or parallel to each of the two opposite disk surfaces of the second pulley.

For example, in order to create an arrangement in which the measuring field of the laser light recording device in Step C can be struck by the laser light beam, the laser of the laser light emitting device can be pivoted at a right angle to the beam axis of the laser's oriented laser pivot axis, whereby a desired or set pivot adjustment of the laser can preferably be locked around the laser pivot axis or is configured in a locked position. The lock here can be realized in any manner, e.g. in the form of a friction lock or a form lock.

As a result of the fact that in Step B, the laser light recording device is located in such a way on the second pulley that the Y1 coordinate axis of the measuring field is oriented parallel to the rotational axis of the second pulley, the X1 coordinate axis features a desired spatial orientation or alignment to the second pulley, and the centre of the coordinate system features a predefined axial distance from the second pulley, the spatial position of the coordinate system of the measuring field and/or the spatial position of the measuring field at or in the chosen position on the second pulley is defined exactly, and/or the spatial position of the measuring field relative to the second pulley is determined exactly since the position of the laser light recording device at the second pulley is specified or known. Accordingly, in step D as well, the definition of the coordinate system is carried out relative to the first pulley.

The desired spatial orientation or arrangement of the X1 coordinate axis can be realized in any conceivable way. In particular, a desired orientation of the X1 coordinate axis or a desired arrangement of the X1 coordinate axis relative to the first and/or second pulleys and/or relative to the rotational axis of the first and/or second pulley, such as by pivoting around the pivot axis of the laser light recording device, can be set in such a way that the pivot axis is oriented parallel to the Y1 coordinate axis of the measuring field.

Preferably, the measuring field can be locked in the pivot position chosen for creating the desired alignment of the X1 coordinate axis.

Using the Y1 coordinates of the laser light spot that was recorded on the measuring field in Step C by the laser light sensor by irradiating the measuring field with the aligned laser light beam—the laser light beam which is orientated or arranged at a axial distance of the laser light beam or the laser light reference plane from the second pulley can also be determined arranged in such a position on the second pulley that the Y coordinate axis of the measuring field is oriented parallel to the rotational axis of the second pulley, and the centre of the coordinate system shows a predefined axial distance to the second pulley. As a result it is possible, by using the Y-coordinate of the laser light spot as determined in Step C and the pre-defined axial distance, to determine or calculate, the distance of the laser light beam or the laser light reference plane to the second pulley.

After the preparatory steps A through C, steps D and E are intended to actually record the relative orientation of the two pulleys to one another. For this purpose, in Step D, the laser light recording device—after it has been removed from the second pulley—is arranged in at least one position in the already described manner to the first pulley, whereby preferably a predefined axial distance to the first pulley can be chosen which corresponds to the predefined axial distance to the second pulley as per Step B. Maintaining the predefined or specified distance can be achieved, in particular, by providing a spacer at the laser light recording device which allows a predefined or predetermined axial distance to be maintained in such a way that the spacer ensures, when arranging the laser light recording device in the position on the second pulley or at least in one position at the first pulley, that this predefined axial distance is maintained. Preferably, a predefined axial distance from the first pulley should be chosen which corresponds to the predefined axial distance to the second pulley as per Step B, which provides the advantage, among others, that this reduces the work involved in determining the alignment of the first pulley relative to the second pulley. Furthermore, it is advantageous to not undertake any re-adjustments that may lead to errors.

In step E, the irradiation of the measuring field is performed with the laser light or the laser light beam of the laser of the laser light-emitting device whose direction has been aligned as per Step C, and the recording of the X1 and Y1 coordinates of the light spots that are forming on the measuring field, whereby the measuring field can be irradiated in at least one position by pivoting the laser around the laser pivoting axis in such a way that the X1 and Y1 coordinates of at least three laser light spots can be recorded on the measuring field. During the irradiation of the measuring field with the laser light or the laser light beam of the laser of the laser light emitting device, the laser light emitting device remains in its position on the second pulley and the alignment of the direction of the laser light beam made in Step C is maintained. The only movement that is made is the pivoting of the laser around the laser pivot axis in order to irradiate the measuring field with the laser light beam aligned in Step C, while maintaining the position of the laser light emitting device on the second pulley and while maintaining the set orientation of the laser beam.

Because the X1 and Y1 coordinates are recorded by at least three laser light spots on the measuring field, the position of the above-described laser light reference plane relative to the first pulley can be determined with precision since a plane is clearly defined by three points, and the X1 and Y1 coordinates of these laser light spots are coordinates of at least one coordinate system that is located in a known position relative to the first pulley, because the position in which the laser light recording device is located in step D on the first pulley is known or specified and/or because the actual position is a pre-defined or specified position. In the event that in step D, for example, an arrangement of the laser light recording device is planned in two or three different positions at the first pulley, there would be two or three coordinate systems with a known position in relation to the first pulley.

It is understood that the X1 and Y1 coordinates of the laser light spots can be transformed by coordinate transformation to a single coordinate system which has its origin in a defined position in relation to the first pulley so that the position of the laser light reference plane can be beneficially presented in a simple way in one single coordinate system.

From the position of the above-described laser light reference plane relative to the first pulley, one can then also determine the orientation of the first pulley with respect to the second pulley by including or using the distance of the laser light reference plane to the first pulley (see also above), whereby the alignment comprises the position of the laser light reference plane relative to the first pulley and the distance of the laser light reference plane to the second pulley and/or which is characterized by the position of the laser light reference plane relative to the first pulley and the distance of the laser light reference plane to the second pulley.

In light of the above, the method includes Step F for determining the alignment of the first pulley with respect to the second pulley on the basis of the recorded X1 and Y1 coordinates of the laser light spots in at least one position and the Y1 coordinate recorded in step C, whereby the recorded X1 and Y1 coordinates of the laser light spots are the X1 and Y1 coordinates recorded in Step E.

Somewhat more detailed or alternatively, the method can also include the following Step F: Determining the alignment of the first pulley with respect to the second pulley on the basis of the recorded X1 and Y1 coordinates of the laser light spots and the position of the measuring field's coordinate system (or the location of the origin of the measuring field's coordinate system) relative to the first pulley in at least one position or in at least one predetermined position on the first pulley and on the basis of the Y1 coordinate determined in Step C. Thus one can determine the position of the measuring field's coordinate system relative to the first pulley in at least one position of the laser light recording device at the first pulley from the coordinates of this position in a pulley coordinate system of the first pulley, which has a predefined position or specified position in relation to the first pulley, or which has a coordinate system that is fixed to the first pulley. In order to define the position of the laser light recording device on the pulley, one could, for example, use an arbitrary body point on the laser light recording device, whose coordinates in the pulley coordinate system define the position of the laser light recording device.

Accordingly, the respective position of the laser light emitting device may be defined at the respective pulley. In particular, one can very simplistically use the coordinates of the centre of the measuring field's coordinate system in the pulley coordinate system to define the position of the laser light recording device on the pulley.

Altogether, using the above-described methods, one can then determine the alignment of the first pulley in relation to the second pulley with high precision, without significantly limiting the precision due to the design of the belt drive or the pulleys. In particular, because of the fact that in Step C the direction of the laser light beam is aligned at a right angle to the rotational axis of the second pulley, manufacturing-related deviations from a planar or level design of the disk surfaces are irrelevant—completely in contrast to current solutions in which a laser and a receiver are placed flush against the disk surfaces of the pulleys. The alignment of the direction of the laser light beam at a right angle to the rotational axis of the second pulley can be realized in any conceivable manner. So it would be possible, for example, to align the laser light beam at a right angle to a stop rod in the form of a round rod or a rod in the form of a circular cylinder, with its lateral surface being placed flush against the side surface or the continuous running surface of the pulley in order to provide a parallel orientation to the rotational axis. As a result of this, one would beneficially no longer be dependent on one of the two opposing disk surfaces, which may deviate quite strongly from an ideal planar design. Above all, due to the available alignment functionality of the laser, this method can be used very flexibly for very different belt drives.

It is particularly preferable that the laser of the laser light-emitting device is a point laser. Using a point laser, the method can in particular also be used, due to the beam quality of the point laser, for the alignment of pulleys which have a large distance of, for example 10 meters or more than 10 meters or more than 20 meters, whereby in most belt drives the distances between pulleys are well under 10 meters—most often below 1 meter, so that a very precise determination of the alignment can be made using a point laser.

It is particularly preferable that the laser or point laser may have a beam deviation of less than 0.3 mrad, combined with high focusability.

The arrangement of the laser light recording device in at least one position on the first pulley or in the position on the second pulley can preferably be done using a holding device for the laser light recording device, which is designed in such a way that the laser light recording device is held in an operationally secure position on the first or second pulley. Also, the laser light emitting device may preferably have such a holding device.

Steps A and B of the method may occur concurrently or at least partially at the same time. Steps A and B can be performed sequentially or in reverse order, in such a way that Step B cannot only be done after Step A, but also that Step A can be undertaken after Step B. Steps C, D and E are all carried out after Steps A and B, whereby Step D is done after Step C, and Step E after Step B. Step F is preferably carried out after step E, however, it can also be completed during Step E, in particular if a computer is used to determine the alignment at least at times during Step E.

An axial distance in front and behind is to be understood as a distance in the axial direction, whereby the axial orientation is a parallel direction to the rotational axis of the first or second pulley.

The X1 and Y1 coordinates described above and below or the X2 and Y2 coordinates of the laser light spot of the laser light beam striking the measuring field, or of the laser light spots that form on the measuring field during irradiation with the laser light beam, are, of course, the coordinates of a point, even though the laser light spot always has two-dimensional dimensions on the measuring field. The X1 and Y1 coordinates or X2 and Y2 coordinates of the laser light spot are always to be understood above and below as the coordinates of a point that can be determined from the structure of the surface and/or the light distribution of the laser light spot on the surface. In particular, this point may be, for example, the centroid of the laser light spot. The determination or calculation of the point can preferably be automated by means of a calculation device, such as a computer, on the basis of the digital and/or analogue signals attributed to the respective laser light spot, which are emitted by the laser light sensor. If the laser light sensor is a PSD sensor, the calculation of the centroid can be done, for example, in a known way on the basis of suitable resistance measurements at the sensor corners or the field corners. In calculating the centroid, a surface is analyzed on the respective measuring field. This calculation in a PSD sensor can make it possible to determine movements of a laser light spot on the measuring field in the micron range, so that the size of the laser light spot plays a minor role in a PSD sensor. In a preferred embodiment of the method according to the invention, the laser light sensor is able to pivot around a pivot axis which has a parallel orientation to the Y1 coordinate axis of the measuring field, whereby the laser light recording device or the laser light sensor in Step D is arranged in three positions separate from one another on the first pulley, and in each position the laser and the laser light sensor are brought into a relative position to one another by pivoting the laser light sensor around the pivot axis, and/or by pivoting the laser around the laser pivot axis so that the laser light beam can strike the measuring field; whereby in each position, the X1 and Y1 coordinates of at least one laser light spot are recorded on the measuring field.

With this preferred embodiment, the laser light recording device is to be attached on the first pulley in three positions that are at a distance from one another, so that in a simple and practical manner, one can record the X and Y coordinates of altogether at least three laser light spots on the measuring field by moving the laser light recording device to the second pulley, these laser light spots are needed to determine the position of the aforementioned laser light reference plane relative to the first pulley. A preferable embodiment here is a pivoting position of the laser light sensor around the rotational axis which can be locked, as well as a pivoting adjustment of the laser around the laser pivot axis which can be locked, so that preferably the measuring field can be irradiated with the laser light beam while the relative position of the laser to the laser light sensor is maintained in an operationally secure fashion.

Preferably, the three positions are located at a distance from one another in the circumferential direction or in the circumferential direction around the rotational axis of the first pulley and/or the three positions are chosen such that the centre of the coordinate system of the measuring field is located in one of the positions at a distance from the centre of the measuring field in each of the other remaining positions in circumferential direction or in circumferential direction around the rotational axis of the first pulley. Such positions may be beneficially attained in particular by providing suitable retaining devices or holding devices for holding or attaching the laser light recording device at the first pulley with high accuracy and reproducibility.

For an especially beneficial embodiment of the invention, two of the positions are chosen in such a way that a straight connecting line connecting the centre of the coordinate system of the measuring field in the one position with the centre of the coordinate system of the measuring field in the other position, intersects the rotational axis of the first pulley. By providing this geometry, a large distance can be achieved between the two positions, so that ultimately the accuracy of the alignment to be determined in respect of the first pulley can beneficially be increased in reference to the second pulley. The greater the chosen distance is between the respective positions, the smaller is the influence of possible error sources or influencing factors which can limit measurement accuracy, such as, for example, the measurement accuracy of the measuring field.

In a further advantageous embodiment of the method, the centre of the coordinate system is at a distance from the rotational axis in each of the two positions, which corresponds to the diameter of the pulley or 0.8 to 0.95 times the diameter of the pulley. With such a large distance, the alignment of the first pulley with respect to the second pulley can be determined very accurately because the sources of error or influencing factors only have a slight influence. In particular, when using comparably small pulleys with a diameter of less than 80 mm, a distance within the above ranges can be particularly well implemented and is therefore advantageous.

In a practical embodiment of the method, the laser light recording device is located in step D in a position on the first pulley, and the laser of the laser light emitting device is pivoted in Step E in such a way that the laser light spot moves on the measuring field.

Also by using this practical embodiment of the method, the alignment of the first pulley with respect to a second pulley can be very accurately determined, whereby preferably the laser light recording device is to be arranged only in a position on the first pulley, and the minimum of three laser lights spots which are necessary to determine alignment can be formed by simple movement of the laser light spots on the measuring field, whereby this movement of the laser light spot can be created through simple pivoting of the laser around the laser pivot axis.

In a further preferred embodiment, the laser light recording device features a second measuring field with a coordinate system having an X2 coordinate axis and a Y2 coordinate axis which is at a right angle to the X2 coordinate axis, whereby the Y2 coordinate axis of the second measuring field is parallel to the Y1 coordinate axis of the first measuring field, whereby furthermore a beam splitter is provided which splits the laser light beam of the laser light emitting device prior to striking the measuring fields into a first partial beam and a second partial beam, whereby the first partial beam may strike the first measuring field, and whereby the second partial beam may strike the second measuring field, whereby the travel time of the first partial beam to the first measuring field is less than the travel time of the second partial beam to the second measuring field, whereby the beam splitter has a level entry surface and a parallel exit surface, whereby the entry surface is aligned parallel to the Y1 coordinate axis, whereby the first and second measuring field are aligned with respect to the beam splitter in such a manner that when the first partial beam creates a laser light spot in the centre of the coordinate system when irradiating the first measuring field at a right angle to the Y1 coordinate axis, the second partial beam creates a laser light spot in the centre of the coordinate system of the second measuring field when irradiating the second measuring field, whereby as a consequence of the difference in travel time between the two partial beams in a state in which the beam direction of the laser light beam in Step C deviates from the state and or the situation, in which the beam direction is at a right angle to the rotational axis of the second pulley, a difference (or a difference which is not zero) between the Y1 coordinate of the laser light spot on the first measuring field and the Y2 coordinate of the laser light spot on the second measuring field is present, so that in Step C, the laser is pivoted around the adjustment axis until the difference between the Y1 and Y2 coordinates equals zero, or is substantially equal to zero.

This preferred embodiment advantageously facilitates very simple and practical alignment of the direction of the laser light beam of the laser light emitting device at a right angle to the rotational axis of the second pulley in Step C. The laser is only to be rotated around the adjustment axis until the difference between the Y1 and Y2 coordinates is equal to zero or the Y2 coordinate is no longer different than the Y1 coordinate.

The first partial beam is preferably the partial beam that extends continuously through the beam splitter which emerges from the level exit surface or which emerges from the level exit surface in an offset position parallel to the laser light beam while the second partial beam can be the partial beam that is reflected at the two-dimensional entry surface. The reverse constellation is also conceivable, which means that the first partial beam is the reflected partial beam and the second partial beam is the partial beam emerging from the exit surface. In particular, for example, one can also provide at least one further deflection device, such as a mirror, in order to make it possible for the first partial beam to strike the first measuring field and the second partial beam to strike the second measuring field. Furthermore, one can provide, for example, at least one lens to influence or shape the beam path of the partial beams.

The measurement system for determining the alignment of a first pulley of a belt drive with respect to a second pulley of the belt drive comprises a laser light emitting device and a laser light recording device, whereby the laser light emitting device comprises a laser with a beam axis which can be pivoted around a laser pivoting axis that is oriented at a right angle to the beam axis of the laser, whereby the laser is further pivotable around an adjustment axis of the laser light emitting device which is at a right angle to the laser pivot axis of the laser light emitting device, whereby the laser light recording device includes a laser light sensor with a level measuring field, whereby the measuring field has a coordinate system with an X1 coordinate axis and a Y1 coordinate axis perpendicular to the X1 coordinate axis, whereby the laser light sensor is set up to record the X1 and Y1 coordinates of a laser light spot of the laser light beam on the measuring field which strikes the measuring field.

The laser light emitting device is set up to be arranged in a position on a pulley such that the laser pivot axis is oriented parallel to the rotational axis of the pulley. The laser light recording device is oriented in such a way that it can be arranged in a position on a pulley such that the Y1 coordinate axis of the measuring field is oriented parallel to the rotational axis of the pulley, the X axis features a desired spatial arrangement or orientation, and the centre of the coordinate system has a predefined axial distance to the pulley. This alignment of the laser light emitting device and laser light recording device can, for example, be realized by means of a holding device or a retention device of the laser light emitting device or the laser light recording device, for holding or alignment in the respective position on the pulley.

Using the measurement system—it is possible, on the basis of the aforementioned reasons—to determine the alignment of a first pulley of a belt drive in relation to a second pulley of the belt drive with high accuracy without limiting or significantly limiting the accuracy due to the design of the belt drive or the pulleys.

In a practical embodiment of the measuring system, the laser light recording device has a second measuring field with a coordinate system with an X2 coordinate axis and a Y2 coordinate axis which is at a right angle to the X2 coordinate axis, whereby the Y2 coordinate axis of the second measuring field is parallel to the Y1 coordinate axis of the other measuring field, whereby furthermore a beam splitter is provided which splits the laser light or the laser light beam of the laser light emitting device prior to striking the measuring field into a first and a second partial beam, whereby the first partial beam may strike the first measuring field, and the second partial beam may strike the second measuring field, whereby the travel time of the first partial beam to the first measuring field is lower than the travel time of the second partial beam to the second measuring field, whereby the beam splitter has a level entry surface and a parallel exit surface, whereby the entry surface is oriented parallel to the Y1 coordinate axis, whereby the first and second measuring field are oriented in such a way in relation to the beam splitter, that when the first partial beam forms a laser light spot upon irradiation of the first measuring field at a right angle to the Y1 coordinate axis in the centre of the coordinate system of the first measuring field, the second partial beam forms a laser light spot in the centre of the coordinate system of the second measuring field upon irradiation of the second measuring field.

This practical embodiment advantageously allows, in a very simple and practical manner, the alignment of the direction of the laser light beam emitted by the laser light-emitting device at a right angle to the rotational axis of the second pulley. The laser is only to be pivoted around the adjustment axis until the difference between the Y1 coordinate and the Y2 coordinate is equal to zero.

In a preferred embodiment of the measuring system, the laser light emitting device has at least one round rod for flush placement against the lateral surface or cylinder surface of the round rod to at least one continuous surface of the pulley when aligning it in the position of the pulley, whereby the circumferential surface of the pulley extends in the axial direction of the pulley and around a rotational axis, and whereby the longitudinal axis of the round rod is aligned parallel to the laser pivot axis of the laser light emitting device. Using such a round rod or a circular cylindrical rod, the laser light emitting device can be aligned in such a position on the pulley that one can implement a very exact parallel orientation of the laser pivot axis to the rotational axis, which results in a very high degree of precision of the determined alignment of the pulleys. The circumferential surface against which the lateral surface is placed flush can be the running surface or the side surface of the pulley or a partial surface of this. These surfaces are as a rule manufactured much more precisely that any of the two mutually opposite surfaces of the pulley so that alignment by means of these surfaces can be achieved with a great deal of precision when determining the alignment of the pulleys towards one another.

In a further preferred embodiment of the measuring system, the laser light recording device comprises at least one rod for flush placement of the lateral surface or cylindrical surface of the round rod against at least one circumferential surface of the pulley when attaching the same in the position on the pulley, whereby the circumferential surface of the pulley extends in an axial orientation of the pulley and circumferentially around the rotational axis, and whereby the longitudinal axis of the round rod is aligned parallel to the Y coordinate axis of the measuring field.

Using such a round rod or a circular-cylindrical rod, the laser light recording device can be arranged similar to the aforementioned information in a position on the pulley so that a very exact parallel alignment of the Y1 coordinate axis of the measuring field to the rotational axis can be realized, along with providing high accuracy in determining the alignment of the pulleys to one another. In particular, by means of such a round rod, the pivot axis of the laser sensor can advantageously be positioned very close to the edge area of the respective pulley, which beneficially allows for large measurement distances between various positions to be realized which advantageously improves the accuracy of the determined alignment.

SHORT DESCRIPTION OF THE DRAWINGS

Figure 2B:
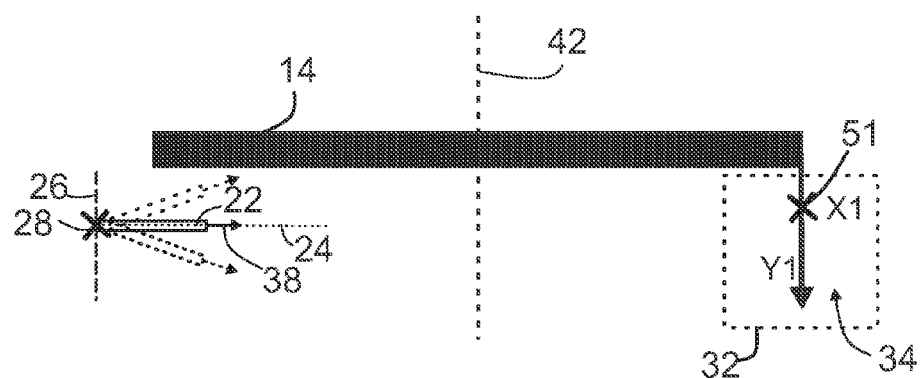
Figure 3A:
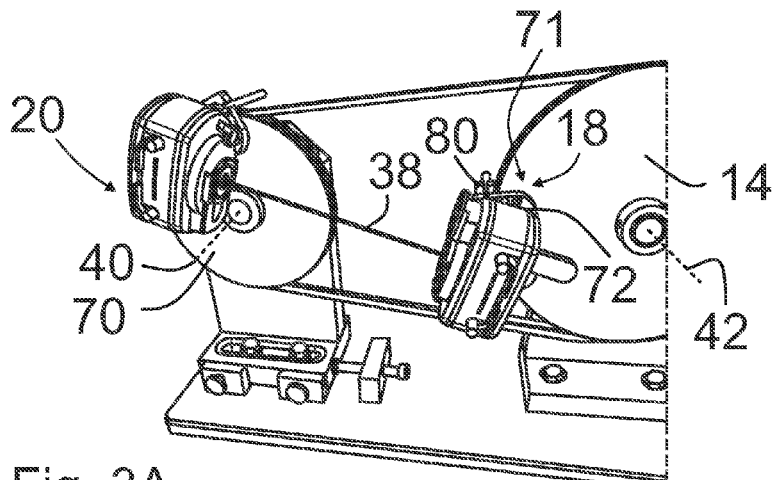
Figure 3B:
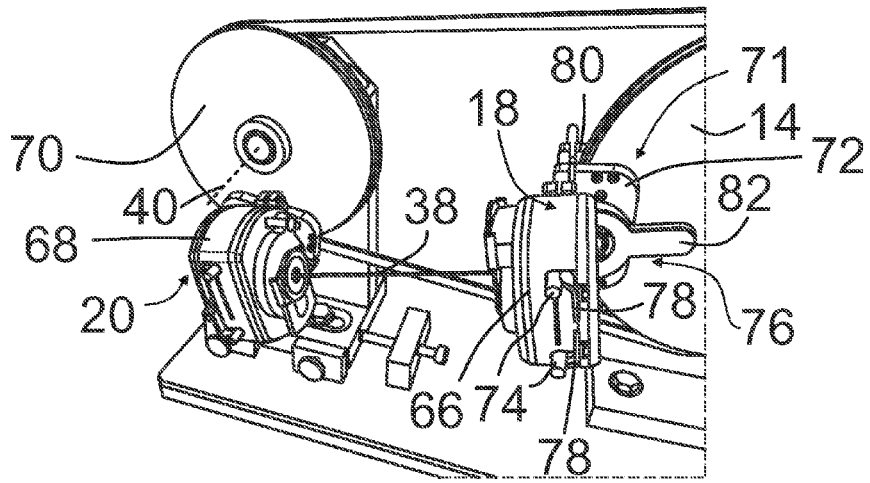
Figure 3C:
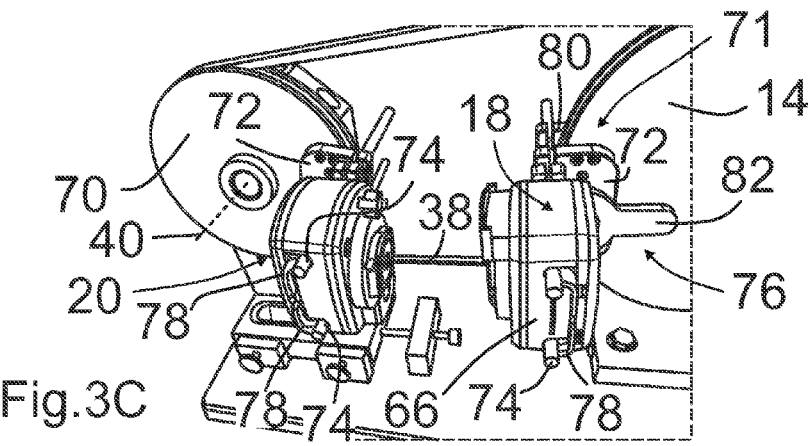

The following will explain the design examples of the invention in detail using the attached drawings. The drawings show the following:

FIG. 1A a three-dimensional presentation of the design example of the measurement system in accordance with the invention combined belt drive FIG. 1B a three-dimensional presentation of the laser light emitting device of the measurement system as per FIG. 1A FIG. 1C a schematic drawing to illustrate a laser light sensor FIG. 2A a further three-dimensional view of the measuring system, with the laser light emitting device and the laser light recording device arranged on a second pulley of the belt drive, FIG. 2B a schematic diagram illustrating the alignment of the laser light beam, FIG. 3A to 3C respectively three-dimensional representations of the measurement system in conjunction with the belt drive, which differ based on the alignment of the laser light emitting device relative to the laser light recording device.

Figure 4A:
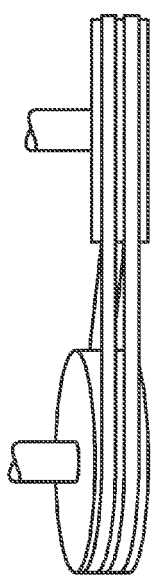
Figure 4B:
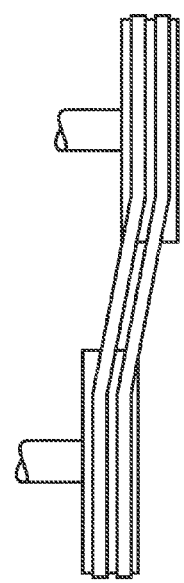
Figure 4C:
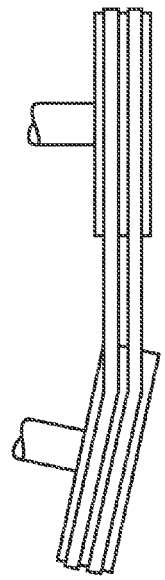
Figure 5:
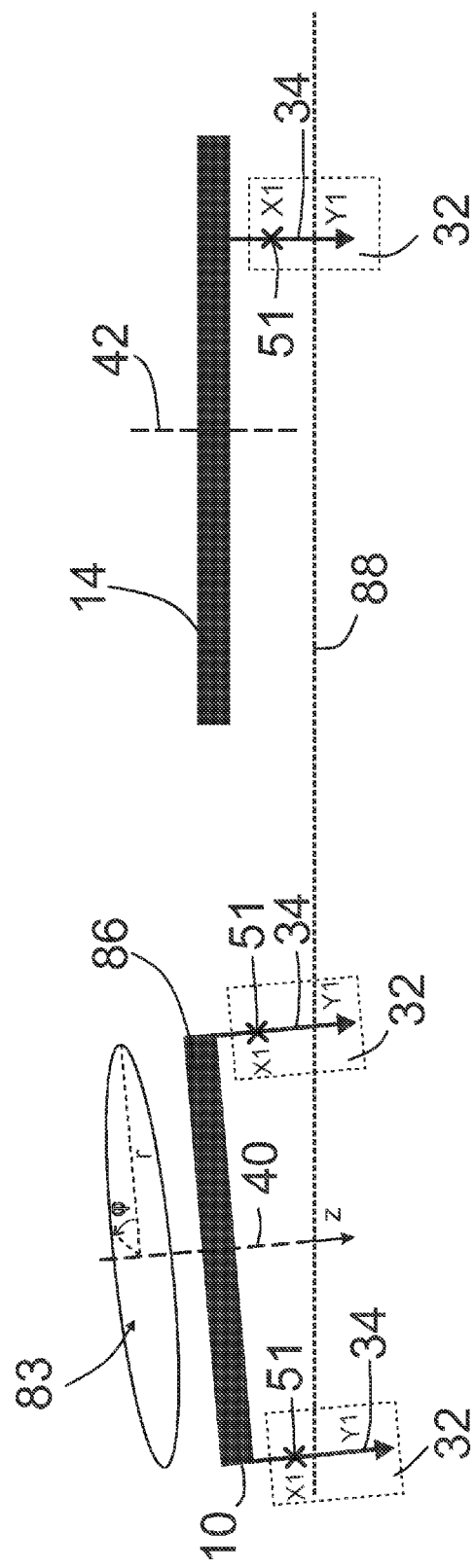

FIG. 4A to 4C respectively, schematic views for illustrating possible erroneous alignments, FIG. 5 a schematic diagram illustrating the location of the coordinate system of the measuring field in different positions on the first and second pulley, FIG. 6A, 6B respectively schematic diagrams illustrating the orientation of the laser light beam using the laser light recording device with utilization of a second measuring field and a beam splitter.

DETAILED DESCRIPTION

The measurement system 16 according to FIG. 1A, for determining the alignment of a first pulley 10 of the belt drive 12 with belts 13 in relation to a second pulley 14 of the belt drive 12, comprises a laser light emitting device 18 and a laser light recording device 20.

The laser light emitting device 18 features a laser 22 with a beam axis 24, which is pivotable around a beam axis 26 at a right angle to beam axis 24 of the laser 22. Furthermore, the laser 22 can be pivoted around an adjustment axis 28 of the laser light-emitting device that is oriented at a right angle to the laser pivot axis 26. The laser 22 of the laser light-emitting device 18 is located inside a housing 66 of the laser light-emitting device 18 and accordingly cannot be seen in the three-dimensional presentation. The design of the laser 22, however, is highlighted in greater detail in FIG. 2B, from which one can in particular, see the position or the orientation of the adjustment axis 28 and the laser pivot axis 26. In FIG. 2B and in other figures, in each case an axis is shown with the symbol "X," which extends at a right angle into or out of the drawing layer.

The laser light recording device 20 comprises a laser light sensor 30 with a level measuring field 32. The measuring field 32 has a coordinate system 34 with an X1 coordinate axis and a Y1 coordinate axis which is at a right angle to the X1 coordinate axis. The laser light sensor 30 of the laser light recording device 20 is contained in a housing 68 of the laser light recording device 20 and therefore cannot be seen in the three-dimensional representation. The design of the laser light sensor 30, however, is further illustrated in FIG. 1C.

The laser light sensor 30 is designed in such a manner to record the X1 and Y1 coordinates of a laser light spot 36 measuring field of a laser light beam 38 that strikes measuring field 32.

The laser light emitting device 18 has a holding device 71, with which the laser light emitting device 18 can be aligned or held in such a position on the first pulley 10 and the second pulley 14 that the laser pivot axis 26 (see also FIG. 2B) is oriented parallel to the respective rotational axis 40 or 42 of the pulleys 10 or 14. For this purpose, the holding device 71 has two plates 72 and 80 (only visible in FIGS. 1B, and 3A to 3C) in order clamp the laser light emitting device 18 to the first or second pulley 14, whereby both plates, 72, 80 are held on two round rods or round bars 58 (see FIG. 1B) in a sliding manner, they can be locked at the round rods or bars 58 by means of locking devices that are not shown in greater detail, in a clamped position in a condition where they lie flush against opposite disk surfaces 70 of the first or second pulley 14.

Furthermore, the lateral surface 60 of each round bar 58 may be placed flush against two circumferential surfaces 62 of the pulley 10 or 14, wherein each circumferential surface 62 is oriented in the axial direction of the pulley 10 or 14 and extends circumferentially around the rotational axis 40, 42 of the first and second pulleys 10, 14, whereby the longitudinal axis 64 of round rod 58 is oriented parallel to the laser pivot axis 26 of the laser light emitting device 18. Using the round rods 58, the laser light emitting device 18 can be arranged in such a way in a position on the pulley 10 or 14 that a very exact parallel alignment of the laser pivot axis 26 to the rotational axis 40 or 42 can be realized (see in particular FIG. 1B).

The housing 66 of the laser light emitting device 18 can be slid on two rods 74 of a holding element 76 (see also FIG. 3B) of the holding device 71, and can be locked by means of two locking levers 78 to the rods 74. In order to realize the pivotability of the laser 22 around the laser pivot axis 26 which is at a right angle to the beam axis 24 of the laser 22, the holding element 76 is rotatably attached to the plate 72. The holding element 76 further includes a pivoting lever 82, over which the laser 22 together with its housing 66 can be pivoted around the laser pivot axis 26.

The laser light recording device 20 also comprises a retaining device 73 (see FIG. 1A) with which the laser light recording device 20 can be aligned or respectively held in a position on the pulley 10 or 14 or held, which aligns the Y1 coordinate axis of the measuring field 32 parallel to the rotational axis 40 or 42 of the pulley 10 or 14, the X1 axis features a desired spatial arrangement and the centre 51 of the coordinate system 34 features a predefined axial distance to the pulley 10 or 14. This layout geometry is shown in FIG. 5 very schematically in a top view of the running surface 86 of the first pulley 10 for two positions of the laser light recording device 20 on the first pulley 10.

One can also see in FIG. 5 how the position of the coordinate system 34 of the measuring field 32 (or the position of the centre 51 of the coordinate system 34 of the measuring field 32 relative to for example the first pulley 10 in a pulley coordinate system 83 which is fixed to the pulley 10 can be defined in an only very schematically shown cylindrical coordinate system 83 through the cylinder coordinates of the centre 51, whereby the position of the entire laser light recording device 20 can advantageously also be defined at the first pulley 10 or the second pulley 14. FIG. 5 also illustrates the position of the laser light reference plane 88 for the second pulley 14 which can be created by pivoting the laser 22 around the laser pivot axis 26.

The holding device 73 (see FIG. 1A) is almost identical in construction to the holding device 71 and differs from it only in that only one plate 72 is provided, which, due to its magnetic design and the magnetic design of the first and second pulleys 10, 14, can be held in a flush position against the respective disk surfaces 70 by means of magnetic force in order to facilitate a parallel orientation of the Y1 coordinate axis of the measuring field 32 to the rotational axis 40 or 42. Of course, the holding device 73 can be entirely identical in construction to the above retaining device 72 and thus in particular to the additional plate 80.

Also, the housing 68 of the laser light recording device 20 can be locked via two locking levers 78 on rods 74 (see FIG. 3C)

In the following, a design example of the method is explained in detail. The method comprises the steps of A to F.

In step A (see FIG. 2A), the laser light emitting device 18 is arranged in a left-hand position or in the 9 o'clock position at the second pulley 14, whereby the laser light emitting device 18 is arranged in such a way at the second pulley 14 that the laser pivot axis 26 is oriented parallel the rotational axis 42 of the second pulley 14. This arrangement with the desired orientation can be realized by means of the holding device 71 in a simple and practical manner.

In Step B (see FIG. 2A), the laser light recording device 20 is attached in a 3 o'clock position on the second pulley 14, which is spaced apart from the 9 o'clock position of the laser light emitting device 18, such that the Y1 coordinate axis of measuring field 32 is oriented parallel to the rotational axis 42 of the second pulley 14, the X1 coordinate axis features a desired spatial arrangement, and the centre of the coordinate system 34 features a predefined axial distance to the second pulley 14. This arrangement with these desired conditions can be accomplished by means of the holding device 73 in a simple and practical manner whereby a desired spatial arrangement of the X1 coordinate axis of the measuring field 32 can be accomplished by pivoting the housing 68 and with it the laser light sensor 30 around a pivot axis 44, whereby the pivoting is accomplished by activating a pivot lever which is not shown, which is structurally identical to the pivot lever 82 of the holding device 71.

In step C (see in particular FIG. 2B), the orientation of the direction of the laser light beam 38 that is emitted by laser light emitting device 18 in a right angle to rotational axis 42 of the second pulley 14 is achieved by pivoting the laser 22 around the adjustment axis 28 and by recording the Y1 coordinates of the laser light spot 36 on the measuring field 32 by means of the laser light sensor 30 when irradiating the measuring field 32 with the aligned laser light beam 38. Pivoting the laser 22 is done in a simple and practical way with a knurled screw 84 (see FIG. 2A) which is mechanically connected with an adjustment device that is not shown in greater detail, in order to pivot the laser 22 around the rotational axis 28 by means of turning the knurled screw 84 through the adjustment device.

In particular, to orient the laser light beam 38 as per Step C, the laser light recording device 20 features in its housing 68 a second level measuring field 48 and a beam splitter 52, see in regards to this the schematic drawings of FIGS. 6A and 6B.

The second measuring field 48 (see FIG. 6A) features a coordinate system 50 with an X2 coordinate axis and a Y2 coordinate axis which is at right angle to the X2 coordinate axis, whereby the Y2 coordinate axis of the second measuring field 48 is parallel to the Y1 coordinate axis of the first measuring field 32.

The beam splitter 52 splits the incoming laser beam 38 of the laser light emitting device 18 prior to striking the measuring fields 32 and 48 into a first partial beam 54 and a second partial beam 56.

The first partial beam 54 may strike the first measurement field 32 and the second partial beam 56 may strike the second measuring field 48. The travel time of the first partial beam 54 to the first measuring field 32 is less than the travel time of the second partial beam 56 to the second measuring field 48.

The beam splitter 52 has a level entrance surface 90 and a parallel exit surface 92 whereby the entry surface 90 and the exit surface are parallel to the Y1 coordinate axis.

The first and second measurement field 32 and 48 are arranged in relation to the beam splitter 52 in such a way that when the first partial beam 54 hits the first measuring field 32 perpendicular to the Y1 coordinate axis of a laser light spot in the centre 51 of the coordinate system 34 of the first measuring field, the second partial beam 56, forms a laser light spot in the centre 51 of the coordinate system 50 of the second measuring field 48 during irradiation of the second measuring field 48.

As a consequence of the travel time difference between the two partial beams 54 and 56, in a condition in which in Step C the beam direction of the laser light beam 38 deviates from the situation in which the beam direction is oriented at a right angle to the rotational axis 42 of the second pulley 14, there is a difference between the Y1 coordinate of the laser light spot on the first measuring field 32 and the Y2 coordinate of the laser light spot on the second measuring field 48 measuring field so that in Step C, the laser 22 is pivoted around the adjustment axis 28 or is pivoted until the difference between the Y1 coordinate and the Y2 coordinate is equal to zero. Or in other words: A non-right-angled alignment of the beam direction of the laser 22 leads, as a result of the travel time difference between the two partial beams 54 and 56, to a difference between the Y1 coordinate and the Y2 coordinate of the laser light spot.

FIG. 6A illustrates the arrangement in a schematic sectional presentation with a section through the beam splitter which is chosen in such a way that the Y1 coordinate axis and the Y2 coordinate axis emerge at a right angle out of the drawing layer. FIG. 6B, in contrast, highlights the arrangement very schematically from the side, in order to also illustrate the situation that the laser light beam 38 does not irradiate at a right angle to the rotational axis 42 of the second pulley 14, so that in FIG. 6B, an irradiation situation is illustrated in which a difference is present between the Y1 and Y2 coordinates, which, as also presented above, requires a correction towards zero.

FIGS. 6A and 6B also show that in both measuring fields 32 and 48, in combination with the beam splitter 52 in a small installation space, a significant travel time difference can be created so that on the basis of a difference between the Y1 and Y2 coordinates and/or the angle α, an angular displacement (see FIG. 4C) can be determined in an especially advantageous way by using, for example, the mathematical tangent function between the first pulley 10 and the second pulley 14 with high accuracy. For this it is only necessary that the laser light sensor 20 is arranged at the 3 o'clock position on the first pulley 10 in the aforementioned way, and to irradiate it with the aligned second laser light beam 38 of the laser 22, whereby any potentially required corrections are to be taken into account, for example, due to the parallel displacement of the passing laser light beam 38 through the beam splitter 52.

In step D, the chronologically sequential arranging of the laser light recording device 20 is carried out in the 3 o'clock position (see FIG. 3C), in the 6 o'clock position (see FIG. 3B) and in the 12 o'clock position (see FIG. 3A), whereby the attachment in each of the positions is achieved by means of the holding device 73 in such a way that the above-mentioned conditions are fulfilled, and in each position, the centre 51 of the coordinate system 34 of the measuring field 32 features an axial distance to the first pulley 10 which corresponds to the predefined axial distance as per Step B. In order to maintain the pre-defined axial distance, the housing 68 of the laser light recording device 20 is especially locked with the locking levers 78 to the rods 74 (see FIG. 3C).

Furthermore, in each of the above positions, by pivoting the laser light sensor 20 or the housing 68 around the rotational axis 44 (see FIG. 2A) and/or through pivoting the laser 22 around the laser pivot axis 26, the laser 22 and the laser light sensor 30 are brought in a relative position to one another, in which the laser light beam 38 can strike the measuring field 32 in order to capture in every position the X1 and Y1 coordinates of at least one laser light spot on the measuring field 32, which is formed in Step E during irradiation of measuring field 32 with the aligned laser light beam 38 of the laser 22 of the laser light emitting device 18 on the measuring field 32. Preferably, the relative position is selected by pivoting around the pivot axis 44 and the laser pivot axis 26 in such a way that the laser light beam 38, if possible, strikes measuring field 32 in an almost perpendicular direction since in this case the measuring field 32 is able to record the coordinates very accurately.

In step F, the determination of the orientation of the first pulley 10 in relation to the second pulley 14 takes place on the basis of the recorded X1 and Y1 coordinates of the laser light spots in the three upper positions, and on the basis of the Y1 coordinate recorded in Step C.

In the upper 6 o'clock position and the upper 12 o'clock position, an imaginary straight connecting line that connects the centre 51 of the coordinate system 34 of the measuring field 32 in one position with the centre 51 of the coordinate system 34 of the measuring field 32 in the other position, intersects with the rotational axis 40 of the first pulley. In each of the above positions, the centre of the coordinate system 34 further features a distance to the rotational axis 40 which corresponds to the diameter of the first pulley 10. This distance situation is illustrated in FIG. 5, which shows that the centre 51 of the coordinate system 34 of the measuring field 32 is arranged in both illustrated positions at the radial height of the diameter of the first pulley 10. Altogether, with this arrangement a very large distance can be created between the two positions in the manner of a large basic length, which substantially improves the accuracy of the determined alignment of the first pulley 10 in relation to the second pulley 14.

The Y1 and X1 coordinates determined during the irradiation of the measuring field 32 with the laser light beam 38 in the upper 12 o'clock and 6 o'clock positions can in particular be used to determine the highlighted vertical displacement shown in FIG. 4A.

In particular, the laser light recording device 20 may be arranged in step D alternatively in a single position on the first pulley 10 and the laser 22 of the laser light emitting device 18 can be pivoted in step E in such a manner that the laser light spot moves on the measuring field 32. This also allows for the recording of X1 and Y1 coordinates of at least three laser light spots on the measuring field that are necessary for determining the alignment. Above all, from the trajectory created by the laser light on the measuring field 32, any possible angular displacement may easily be determined by using simple geometric calculations—for example, using the tangent function.

The parallel displacement illustrated in FIG. 4B can easily be determined, based on the Y1 coordinate recorded in Step 3 and a sole Y1 coordinate C during irradiation of the measuring field 32 with the laser light beam 38 in a position on the first pulley 10.

REFERENCE LIST

10 First pulley
12 Belt drive
13 Belt
14 Second pulley
16 Measurement system
18 Laser light emitting device
20 Laser light recording device
22 Laser
24 Beam axis
26 Laser pivot axis
28 Adjustment axis
30 Laser light sensor
32 Level measuring field
34 Coordinate system
36 Laser light spot
38 Laser light beam
40 Rotational axis of the first pulley
42 Rotational axis of the second pulley
44 Pivot axis
48 Level measuring field
50 Coordinate system
51 Centre
52 Beam splitter
54 First partial beam
56 Second partial beam
58 Round rod
60 Lateral surface
62 Circumferential surface
64 Longitudinal axis
66 Housing
68 Housing
70 Disk surface
71 Holding device
72 Plate
73 Holding device
74 Rod
76 Holding element
78 Locking lever
80 Plate
82 Pivot lever
83 Pulley coordinate system
84 Knurled screw
86 Running surface
88 Laser light reference plane
90 Entry surface
92 Exit surface

The invention claimed is:

1. A method for determining the alignment of a first pulley (10) of a belt drive (12) in relation to a second pulley (14) of the belt drive (12) using a measurement system (16), whereby the measurement system (16) includes a laser light emitting device (18) and a laser light recording device (20), whereby
the laser light emitting device (18) has a laser (22) with a beam axis (24) which can be pivoted around a laser pivot axis (26) that is oriented at a right angle to the beam axis (24) of the laser (22), whereby the laser (22) furthermore is able to pivot around an adjustment axis (28) of the laser light emission device (18) that is perpendicular to the laser pivot axis (26),
whereby the laser light recording device (20) features a laser light sensor (30) with a level measuring field (32), whereby the measuring field (32) has a coordinate system (34) with an X1 coordinate axis and a Y1 coordinate axis which is at a right angle to the X1 coordinate axis, whereby the laser light sensor (30) is set up to record the X1 and Y1 coordinates of a laser light spot (36) of the laser light beam (38) that strikes the measuring field (32) measuring field,
whereby the method is comprised of the following steps:
(A) attachment of the laser light emitting device (18) in any desired position on the second pulley (14), whereby the laser light emitting device (18) is located in such a manner at the second pulley (14) that the laser pivot axis (26) is oriented parallel to the rotational axis (40) of the pulley (14),
(B) alignment of the laser light recording device (20) in a position on the second pulley (14), which is at a distance from the position of the laser light emitting device (18), whereby the laser light recording device (20) is arranged in such a way at the second pulley (14) that the Y1 coordinate axis of the measuring field (32) is parallel to the rotational axis (42) of the second pulley (14), that the X1 coordinate axis features a desired spatial arrangement and the centre (51) of the coordinate system (34) features a predefined axial distance to the second pulley (14),
(C) alignment of the direction of the laser light beam (38) emitted by the laser light emitting device (18) at a right angle to the rotational axis (42) of the second pulley by pivoting the laser (22) around the adjustment axis (28) and recording of the Y1 coordinate of the laser light spot (36) on the measuring field (32) by means of the laser light sensor (30) during irradiation of the measuring field (32) with the aligned laser light beam (38),
(D) arranging the laser light recording device (20) in at least one position on the first pulley (10), whereby the laser light recording device (20) is arranged in such a position on the first pulley (10) that the Y1 coordinate axis of the measuring field (32) is oriented parallel to the rotational axis (40) of the first pulley (10), the X1 coordinate axis has a desired spatial arrangement and the centre (51) of the coordinate system (34) has a predefined axial distance from the first pulley (10),
(E) irradiation of the measuring field (32) with the aligned laser light beam (38) of the laser (22) of the laser light emitting device (18) and recording of the X1 and Y1 coordinates of the laser light spots (36) formed on the measuring field (32), whereby the measuring field (32) is irradiated in at least one position in such a way by pivoting the laser (22) around the laser pivoting axis (26) that the X1 and Y1 coordinates of altogether at least three laser light spots (36) can be recorded on the measuring field (32), and
(F) determining the orientation of the first pulley (10) in relation to the second pulley (14) on the basis of the recorded X1 and Y1 coordinates of the laser light spots (36) in at least one position, and the Y1 coordinate recorded in Step C.

2. A method according to claim 1, characterized by the fact that the predefined axial distance to the second pulley (14) in Step (B) corresponds to the predefined axial distance to the first pulley (10) in Step (D).

3. A method according to claim 1, characterized by the fact that the laser light sensor (30) can be pivoted around a pivot axis (44), which is oriented parallel to the Y1 coordinate axis of the measuring field (32), whereby the laser light recording device (20) is located at the first pulley (10) in three positions that are at a distance from one another and in each position the laser (22) and the laser light sensor (30) can be brought into a relative position to one another by pivoting the laser light sensor (20) around the pivot axis (44) and/or by pivoting the laser (22) around the laser pivot axis (26); in this position the laser light beam (38) may strike the measuring field (32), whereby in each position, the X1 and Y1 coordinates of at least one laser light spot (36) can be recorded on the measuring field (32).

4. A method according to claim 3, characterized by the fact that the three positions have a distance from one another in a circumferential manner.

5. A method according to claim 4, characterized by the fact that two of the positions have been chosen in such a way that a straight connecting line which connects the centre of the coordinate system (34) of the measuring field (32) in the one position with the centre of the coordinate system (34) of the measuring field (32) in the other position, intersects with the rotational axis (40) of the first pulley (10).

6. A method according to claim 4, characterized by the fact that in each of the two positions, the centre (51) of the coordinate system (34) shows a distance to the rotational axis (40) which corresponds to the diameter of the pulley (10) or 0.8 to 0.95 times the diameter of the pulley (10).

7. A method according to claim 1, characterized by the fact that the laser light recording device (20) is arranged in Step (D) in a position on the first pulley (10) and that laser (22) of the laser light emitting device (18) is pivoted in such a way in Step (E) that the laser light spot (36) moves on the measuring field (32).

8. A method according to claim 1, characterized by the fact that the laser light recording device (20) features
a second measuring field (48) with a coordinate system (50) with an X2 coordinate axis and a Y2 coordinate axis which is perpendicular to the X2 coordinate axis, whereby the Y2 coordinate axis of the second measuring field (48) is parallel to the Y1 coordinate axis of the first measuring field (32), whereby furthermore,
a beam splitter (52) is provided which splits the laser light beam (38) of the laser light emitting device (18) prior to striking the measuring fields (32, 48) into a first partial beam (54) and a second partial beam (56),
whereby the first partial beam (54) can strike the first measuring field (32), and whereby the second partial beam (56) can strike a second measuring field (48),
whereby the travel time of the first partial beam (54) to the first measuring field (32) is less than the travel time of the second partial beam (56) to the second measuring field (48), whereby the beam splitter (52) features a level entry surface (90) and parallel exit surface (92), whereby said entry surface (90) is aligned parallel to the Y1 coordinate axis, whereby the first and second measuring fields (32, 48) are arranged in such a way with respect to the beam splitter (52), that when the first partial beam (54) forms a laser light spot (36) during irradiation of the first measuring field (32) at a right angle to the Y1 coordinate axis in the centre (51) of the coordinate system (34) of the first measuring field (32), the second partial beam (56) forms a laser light spot (36) in the centre of the coordinate system (50) of the second measuring field (48) during irradiation of the second measuring field (48), whereby as a result of the travel time difference between the two partial beams (54, 56) in a state in which in step (C) the beam direction of the laser light beam (38) deviates from the state in which the beam direction is aligned perpendicular to the rotational axis (42) of the second pulley (14), a difference between the Y1 coordinates of the laser light spot (36) is found on the first measuring field (32) and the Y2 coordinate of the laser light spot (36) on the second measuring field so that in Step (C) the laser (22) pivots around the adjustment axis (28) until the difference between the Y1 and Y2 coordinates is equal to zero.

9. Measurement system (16) for determining the alignment of a first pulley (10) of a belt drive (12) with respect to a second pulley (14) of the belt drive (12), having a laser light emitting device (18) and a laser light recording device (20), whereby the laser light emitting device (18) features a laser (22) having a beam axis (24) which can be pivoted around a laser pivot axis (26) which is located at a right angle to the beam axis (24) of the laser (22) whereby the laser (22) furthermore can be pivoted around an adjustment axis (28) of the laser light emitting device (18) that is aligned at a right angle to the laser pivot axis (26)

whereby the laser light recording device (20) features a laser light sensor (30) with a level measuring field (32), whereby the measuring field (32) has a coordinate system (34) with an X1 coordinate axis and a Y1 coordinate axis which is perpendicular to the X1 coordinate axis, whereby the laser light sensor (30) is arranged in such a way that the X1 and Y1 coordinates of a laser light spot (36) of a laser light beam (38) which strikes the measuring field (32) are recorded on a measuring field (32), whereby the laser light emitting device (20) is set up in such a way to be located at a pulley (10, 14) in such a way that the laser pivot axis (26) is oriented parallel to the rotational axis (40, 42) of the pulley (10, 14), whereby the laser light recording device (20) is set up to be located in a position on a pulley (10, 14) so that the Y1 coordinate axis of the measuring field (32) is parallel to the rotational axis (40, 42) of the pulley (10, 14), the X1 axis features a desired spatial arrangement and the centre of the coordinate system (34) features a predefined axial distance to the pulley (10, 14).

10. A measurement system (16) according to claim 9, characterized by the fact that the laser light emitting device (18) has at least one round rod (58) for flush placement of the lateral surface (60) of the round rod (58) against at least one circumferential surface (62) of the pulley (10, 14) when installing the same in the position of the pulley (10, 14), whereby the circumferential surface (62) of the pulley (10, 14) extends in the axial direction of the pulley (10, 14) and circumferentially around the rotational axis (40, 42), and whereby the longitudinal axis (64) of the round rod (58) is parallel to the laser pivot axis (26) of the laser light emitting device (18).

11. A measurement system (16) according to claim 9, characterized by the fact that the laser light recording device (20) features at least one round rod (58) for flush placement of the lateral surface of the round rod (58) to at least one circumferential surface (62) of the pulley (10, 14) when installing the same in the position on the pulley (10, 14), whereby the circumferential surface (62) of the pulley (10, 14) stretches in the axial direction of the pulley (10, 14) and circumferentially around the rotational axis (40, 42), and whereby the longitudinal axis (64) of the round rod (58) is oriented parallel to the Y coordinate axis of the measuring field (32).

12. A measurement system according to claim 9, characterized by the fact that the laser light recording device (20) features a second measuring field (48) with a coordinate system (50) having an X2 coordinate axis and a Y2 coordinate axis which is perpendicular to the X2 coordinate axis, whereby the Y2 coordinate axis of the second measuring field (48) is parallel to the Y1 coordinate axis of the first measuring field (32), whereby furthermore a beam splitter (52) is provided which splits the laser light beam (38) of the laser light emitting device (18) prior to striking the measuring fields (32, 48) into a first partial beam (54) and a second partial beam (56), whereby the first partial beam (54) may strike the first measuring field (32), and whereby the second partial beam (56) may strike the second measuring field (48), whereby the travel time of the first partial beam (54) to the first measuring field (32) is less than the travel time of the second partial beam (56) to the second measuring field (48), whereby the beam splitter (52) has a level entrance surface (90) and a parallel exit surface (92), whereby the entry surface (90) is parallel to the Y1 coordinate axis, whereby the first and second measuring fields (32, 48) are arranged in such a way with respect to the beam splitter (52) that when the first partial beam (54), when irradiating the first measuring field (32) at a right angle to the Y1 coordinate axis, forms a laser light spot (36) in the centre of the coordinate system (34) of the first measuring field (32), the second partial beam (56), when irradiating the second measuring field (48), forms a laser light spot (36) in the centre of the coordinate system (50) of the second measuring field (48).

* * * * *